United States Patent [19]
Williams, Jr.

[11] 3,896,580
[45] July 29, 1975

[54] ARTIFICIAL FISHING LURE

[76] Inventor: William O. Williams, Jr., 1309 Lynhurst Dr., Gastonia, N.C. 28052

[22] Filed: Feb. 13, 1974

[21] Appl. No.: 442,128

[52] U.S. Cl. ............. 43/42.31; 43/42.06; 43/42.34; 43/42.39; 43/42.5
[51] Int. Cl............................................. A01k 85/00
[58] Field of Search.............. 43/42.31, 42.5, 42.06, 43/42.34, 42.39

[56] References Cited
UNITED STATES PATENTS

| | | | |
|---|---|---|---|
| 1,596,103 | 8/1926 | James | 43/42.34 X |
| 2,270,487 | 1/1942 | Withey | 43/42.31 |
| 2,909,863 | 10/1959 | Rector et al. | 43/42.31 |
| 3,305,964 | 2/1967 | Wieszeck | 43/42.31 X |

Primary Examiner—Louis G. Mancene
Assistant Examiner—Daniel J. Leach
Attorney, Agent, or Firm—Richards, Shefte & Pinckney

[57] ABSTRACT

An artificial fishing lure including a pair of identically shaped side pieces simulating in appearance the side of a fish, the side pieces being arranged in superimposed relation to one another and being joined together solely by connector elements located, respectively, at the ends of the side pieces. The connector elements may be rings arranged to permit relative movement between the side pieces, or one connector element may be a selectively removable screw which maintains the side pieces in rigid relationship to one another with a removable lead weight carried between the superimposed side members and held in place by the screw. The side members are preferably formed of metal and have a curved configuration to thereby provide an open space between the superimposed side pieces, and metal ball elements may be loosely carried within such open space for producing sounds as the lure moves through the water.

10 Claims, 7 Drawing Figures

PATENTED JUL 29 1975  3,896,580

ARTIFICIAL FISHING LURE

BACKGROUND OF THE INVENTION

Artificial fishing lures come in a substantially infinite variety of forms, principally smaller lures designed to simulate worms, insects and the like, and larger lures designed to simulate fish. Conventional fishing lures of the latter category are usually formed of a one-piece or unitary body construction having the general shape of a fish, and such unitary bodies frequently include deflectors or other guide members which react with the water through which the lure is pulled to cause the lure to simulate the irregular movement of a fish as it passes through the water. Additionally, such unitary fish-simulating lures may also include loosely attached elements which move relative to the lure body and improve the attractive characteristics of the lure, and in some cases the unitary lure body is formed, at least in part, of a flexible material which permits some bending or flexing movement of the lure as it passes through the water.

However, artificial fishing lures having a one-piece or unitary body portion, even when equipped with one of the aforementioned modifications, are essentially rigid structures having a relatively limited capacity for imitating the sinuous body movements of a live fish, particularly with respect to light reflection characteristics. More particularly, the sinuous body movement of a live fish generates a constantly changing surface from which light beneath the water is reflected, whereas the sides of a generally rigid unitary lure body present relatively stationary surfaces which are not as apt to present a continuously changing light reflection pattern.

Finally, it has been found that fish are often attracted by sounds and noises, but conventional fishing lures generally pass silently through the water.

SUMMARY OF THE INVENTION

In accordance with the present invention, an artificial fishing lure is provided which includes a pair of extending side pieces, each simulating the appearance of a side of a fish. These side pieces are arranged in superimposed relation to one another and they are joined together by first and second connectors located at the extending ends, respectively, of the side pieces, these first and second connectors constituting the sole connection between the side pieces.

In one embodiment of the present invention, the side pieces of the lure are connected together loosely by first and second rings passing through apertures at the corresponding ends of the side pieces, these rings being large enough to permit limited movement of the side pieces relative to one another as the lure passes through the water whereby the water causes an irregular pattern of relative movement of the side pieces which closely simulate in appearance the movement of a live fish, particularly when the side pieces are formed of polished metal having a dimpled surface configuration. Additionally, the relative movement of the side pieces causes them to strike one another to generate a sound which has been found to attract fish.

In a second embodiment of the present invention, the superimposed side pieces have sandwiched therebetween a removable weight formed with an opening passing therethrough, and one of the connections passes through the side pieces and through the opening of the weight, and can be tightened to maintain the side pieces and the removable weight in rigid relationship to one another. Preferably, this connector is a screw element having an associated nut which can be readily tightened to obtain the aforesaid rigid relationship while also permitting the weight to be removed or replaced with a different weight to change selectively the weight characteristics of the lure.

In each of the aforesaid embodiments of the present invention, metal balls may be loosely carried between the side pieces of the lure to generate sound as they strike the sides of the lure during its passage through the water. These metal balls may be placed directly between the loosely connected side pieces in the first of the above-described embodiments, such side pieces preferably having concave inner faces for accommodating the balls which roll from side to side as the side pieces move and thereby generate sound by contact with the side pieces and with each other, and in the second of the above-described embodiments the removable weight can be provided with an opening in which the balls are carried between the side pieces for sound generating movement therein.

DESCRIPTION OF THE PREFERRED EMBODIMENTS

Figure 3:
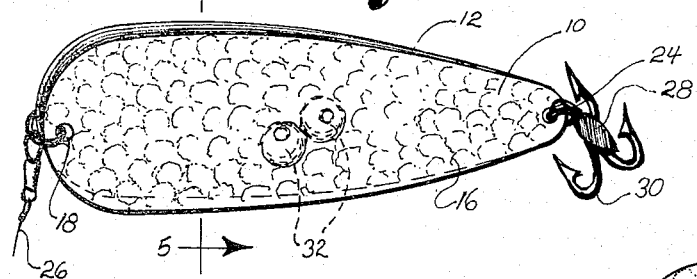
FIG. 3 is a plan view of the fishing lure illustrated in FIG. 1, showing the side pieces in one relative position thereof.
Figure 4:
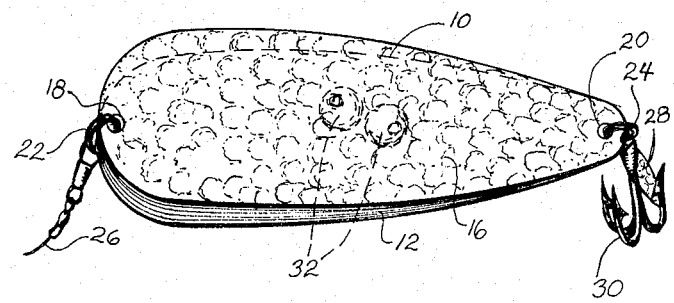
FIG. 4 is a plan view corresponding to FIG. 3 and illustrating the side pieces of the fishing lure in another relative position thereof.
Figure 5:
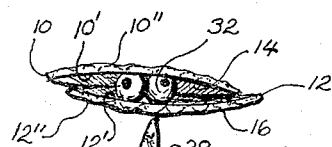
FIG. 5 is a sectional view taken along line 5—5 in FIG. 3.
Figure 6:
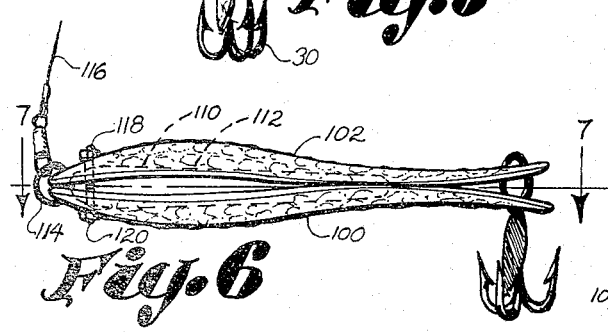
FIG. 6 is a side elevational view of a fishing lure according to another embodiment of the present invention.

Looking now in greater detail at the accompanying drawings, FIGS. 1–5 illustrate a first embodiment of the fishing lure according to the present invention, which includes a pair of extending side pieces 10, 12 each having an identical, generally oval, shape, which simulates in appearance the side of a live fish. Also, as best seen in FIG. 5 the side pieces 10, 12 each have a curved configuration to form concave interior surfaces 10', 12' and convex exterior surfaces 10'', 12'', so that when the side pieces 10, 12 are superimposed upon one another as shown in the drawings, an open space 14 is provided between the facing interior surfaces 10', 12' and the convex exterior surfaces 10'', 12'' more closely simulate the appearance of a live fish. The side pieces 10, 12 are preferably formed of metal with the exterior surfaces 10'', 12'' being highly polished to provide a reflective surface, and these polished exterior surfaces 10'', 12'' are formed throughout their extent with a plurality of adjacent and relatively small dimples 16 which act to simulate the scales of a live fish and to vary the characteristics of the light which is reflected from the exterior sides 10'', 12'' as the lure passes through the water. Additionally, the rear or tail portion of the side pieces 10, 12 are preferably formed to have a slight outward flair, as best seen in FIG. 6.

Each of the side pieces 10, 12 is provided with an aperture 18 at the front end thereof and an aperture 20 at the rear end thereof, and the side pieces are connected together in the aforesaid superimposed relationship by a first connecting ring 22 passing through the front apertures 18 and a second connecting ring 24 passing through the rear apertures 20, it being noted that the first and second connecting rings 22, 24 constitute the sole connection between the side pieces 10 and 12. A leader line 26 may be secured to the first connecting ring 22 for pulling the lure through the water, and the second connecting ring 24 may have loosely attached thereto a metal tail member 28 and a hook 30.

Figure 1:
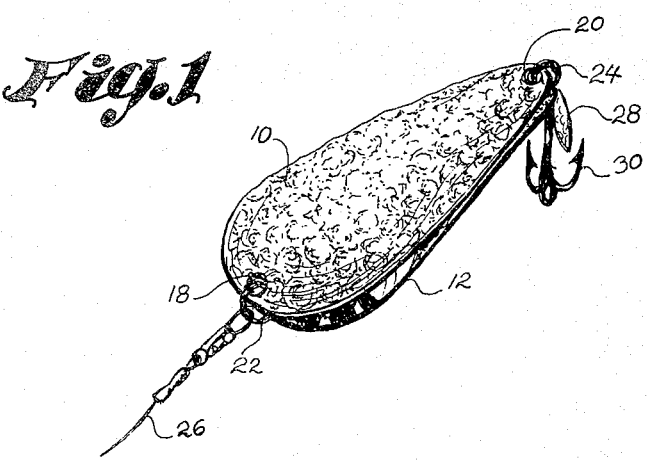
FIG. 1 is a perspective view illustrating one embodiment of the fishing lure of the present invention.
Figure 2:
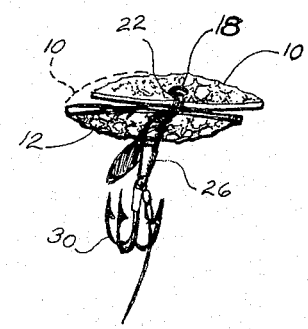
FIG. 2 is a front elevational view of the fishing lure illustrated in FIG. 1.

The connecting rings 22 and 24 have a diameter which is large enough to permit limited movement of the side pieces 10 and 12, such movement being illustrated in FIGS. 2-4. In effect, the diameter of the connecting rings 22 and 24 establishes a maximum radius of relative movement between the side pieces 10 and 12. Thus, as seen in FIG. 2, the side pieces 10 and 12 are shown in full lines in contact with one another and side piece 10 is shown in dotted lines at a position spaced from side piece 12 to the maximum extent permitted by the connecting rings 22 and 24. In FIG. 3, one side piece 10 is shown at its left-most position relative to the other side piece 12 and in FIG. 4 the one side piece 10 is shown at its right-most position relative to the other side piece 12, the two extremes in relative movement being determined by the diameter of the connecting rings 22 and 24. In looking at FIGS. 2-4, it will be appreciated that the relative movement of the side pieces 10 and 12 permitted by the connecting rings 22 and 24 will result in the side pieces 10 and 12 constantly moving relative to one another in a variety of directions as the lure is pulled through the water and the water flows between and around the side pieces 10 and 12 and acts thereon to cause such movement.

This movement has two distinct advantages. First, it will be apparent that the light reflection from the highly polished and dimpled exterior surfaces 10'' and 12'' will be constantly varied because of the movement of the side pieces 10 and 12 so as to closely simulate the light reflection characteristics of a live fish as it swims through the water. Secondly, it has been determined that the generation of low sounds tends to attract fish, and as the side pieces 10 and 12 are constantly moving into and out of contact with one another, low sounds, generally clicking sounds, will be constantly produced by one metal side piece striking the other as the lure moves through the water.

To increase the sound producing capability of the lure of the present invention, small metal balls 32 are placed within the open space 14 provided by the concave interior surfaces 10', 12' as best seen in FIG. 5. These balls 32 have a diameter which is small enough to permit the balls 32 to move freely within the open space 14, and which is large enough to insure that the balls 32 cannot pass between the adjacent peripheral edges of the side pieces 10 and 12 even if the latter are at the most widely spaced relative positions permitted by the connecting rings 22 and 24. As a result, the balls 32 are contained by the side pieces 10 and 12, yet they are freely carried in the space 14 therebetween, and the movement of the lure through the water combined with the relative movement of the side pieces 10 and 12 as described above will cause the balls 32 to constantly strike the sides of the side pieces 10 and 12 as well as one another and thereby produce a rattling sound. It will be recognized that any type of small, movable element could be used as a substitute for the balls 32 so long as the element is free to move within the confines of space 14, but balls are preferred because their ability to roll increases their overall movement within the space 14.

Normally, the weight of the lure will dispose it at a slight inclination to the direction of movement (FIG. 1) so that the force of the water resistance will act against the exposed edge of the interior surface of the upper side piece 10, causing the lure to twist laterally and the side piece 10 to shift within the limits of the connecting rings 22 and 24, with the side pieces striking each other and the balls 32 rolling against the side pieces and against each other to generate sounds. In the shifted position the other edge of the interior surface of the side piece is exposed to the action of the water resistance, causing a return twisting of the lure, reshifting of the side pieces and rolling of the balls. This action continues as a continuous flutter as the lure is pulled through the water (compare FIGS. 3 and 4), creating a movement and sound highly attractive to fish.

Figure 7:
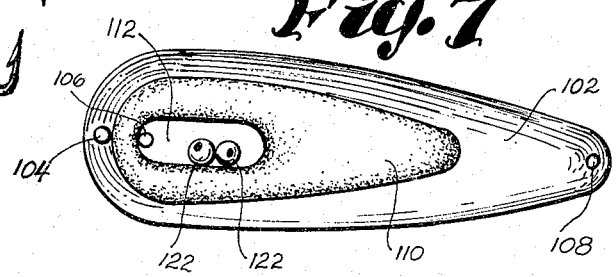
FIG. 7 is a sectional view taken along line 7—7 in FIG. 6.

FIGS. 6 and 7 illustrate an alternate embodiment of the present invention which includes a pair of side pieces 100 and 102 which are identical to the side pieces illustrated in FIGS. 1-5 and discussed above, except each side piece 100 and 102 is provided with two front apertures 104 and 106, rather than just one, although each side piece 100 and 102 is provided with one rear aperture 108 as in the first embodiment described above.

An elongated weight element 110, preferably, formed of lead, is sandwiched between the superimposed side pieces 100 and 102 as seen in FIG. 6, and the weight element 110 is formed with a relatively large opening 112 extending therethrough. A small ring 114 is placed in the most forward front apertures 104 for attachment to a leader line 116 which pulls the lure through the water, and a screw element 118 extends through the other front aperture 106 in both side pieces 100 and 102 as well as through the opening 112 in the weight element 110, a nut 120 being provided at the extending end of the screw element 118. The weight element 110 has a thickness such that it will at least partially contact the interior surfaces of the side pieces 100 and 102 when they are in peripheral contact with one another as seen in FIG. 6, and it will therefore be apparent that the nut 120 can be tightened on the screw element 118 to maintain the side pieces 100 and 102 and the weight element 110 in a rigid relationship to one another with the side pieces 100 and 102 in at least partial peripheral contact and the weight element 110 sandwiched securely therebetween.

Since the side pieces 100 and 102 are maintained in rigid relationship there will be no noise generated from relative movement between the side pieces as in the embodiment shown in FIGS. 1-5, and if noise generation is desired, metal ball members 122 may be placed in the weight element opening 112 as shown in FIG. 7. The ball members 122 are dimensioned so that they remain within the confines of opening 112, yet they are freely movable therein when the side pieces 100, 102 and the weight element 110 are maintained in a rigid relationship as described above. Consequently, as the lure is pulled through the water, the ball members 122 will constantly strike each other, the weight member wall defining the opening 112, and the concavely configured interior walls of the side pieces 100 and 102 adjacent the opening 112, thereby generating a rattling sound similar to that in the first embodiment described above.

Since the nut 120 and screw 118 can be readily detached, it will be apparent that the weight element 110 is removable and can be replaced when desired with another weight element having a greater or lesser weight to thereby selectively vary the weight characteristics of the lure.

The fishing lure of the present invention is extremely versatile in that by providing only the few elements shown in FIGS. 1–7 and described above, the same two side pieces 100 and 102 or 10 and 12 can be used to form a number of distinct lures. First, the side pieces can be loosely connected together by front and rear connecting rings, but without either the weight element or the balls, or the side pieces can be rigidly connected together by the nut and screw, again without either the weight element or the balls. Additionally, ball members may be interposed directly between the two side pieces whether they are rigidly or loosely connected to one another, and if the side members are rigidly connected to one another the selectively removable weight may be used with or without ball members. Thus, a fisherman having only two side pieces and the relatively small number of other elements used in the two embodiments of the present invention described above can select any one of a variety of possible combinations of lure components, each combination having separate and distinct characteristics. Additionally, it is a relatively simple matter to change from one combination to another, and no special tools would be required.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. An artificial fishing lure associated with hook means for attracting and catching fish, said fishing lure including a pair of extending side pieces, each said side piece being of identical shape and simulating in appearance the side of a fish, said side pieces being arranged in superimposed relation to one another with one extending end of each side piece being joined together by a first connecting means and the other extending end of each side piece being joined together by a second connecting means, said first and second connecting means constituting the sole connection between said side pieces and being arranged to provide a loose connection at said ends of said side pieces that maintain said side pieces in generally parallel relation while permitting limited relative shifting thereof.

2. An artificial fishing lure as defined in claim 1 and further characterized in that said superimposed side pieces are formed to provide an open space therebetween, and in that at least one movable element is loosely carried within said open space for producing sounds as said movable element strikes said side pieces during movement of said fishing lure through water.

3. An artificial fishing lure as defined in claim 2 and further characterized in that said side pieces are formed of metal and have a polished exterior surface provided throughout with a plurality of adjacent dimples, and in that said movable element is a metal ball.

4. An artificial fishing lure as defined in claim 1 and further characterized in that each of said side pieces includes an aperture at each extending end thereof, in that said first connecting means includes a first ring member extending through a corresponding aperture at one end of each of said side pieces, and in that said second connecting means includes a second ring member extending through corresponding apertures at the other ends of said side pieces.

5. An artificial fishing lure as defined in claim 4 and further characterized in that each said first and second ring members has a diameter which is large enough to permit limited relative movement of said side pieces during movement of the fishing lure through the water for shifting from side to side to generate sound.

6. An artificial fishing lure as defined in claim 5 and further characterized in that each of said side pieces is formed with a concave surface, in that said concave surfaces face one another in said superimposed position to said side pieces to define an open space therebetween, and in that at least one moveable element is loosely carried within said open space for producing sound as said movable element strikes said side pieces during said movement of the fishing lure through water.

7. An artificial fishing lure associated with hook means for attracting and catching fish, said fishing lure including a pair of extending side pieces, each said side piece being of identical shape and simulating in appearance the side of a fish, said side pieces being arranged in superimposed relation to one another with one extending end of each side piece being joined by a first connecting means and the other end of each side piece being joined together by a second connecting means, and a removable weight member having an opening extending therethrough disposed between said superimposed side pieces, and at least one movable element loosely carried in said weight member opening and maintained therein by said superimposed side pieces whereby said movable element strikes the sides of said weight member opening and said side pieces to produce sound during movement of the fishing lure through the water.

8. An artificial fishing lure as defined in claim 7 and further characterized in that said first connecting means includes a selectively removable element passing through said side pieces and said opening in said weight element to hold the same in place between said side pieces.

9. An artificial fishing lure as defined in claim 8 and further characterized in that said selectively removable element comprises a screw having the head portion thereon bearing against the exterior surface of one of said side pieces and having a nut attached at the other end thereof and tightened firmly against the exterior surface of the other of said side pieces to maintain said side pieces and said weight in rigid relationship to one another.

10. An artificial fishing lure as defined in claim 9 and further characterized in that said weight member is formed of lead, in that said side pieces are formed of metal and have a polished exterior surface provided throughout with a plurality of adjacent dimples, and in that said movable element is a metal ball.

* * * * *